(12) United States Patent
Chang et al.

(10) Patent No.: US 6,867,833 B2
(45) Date of Patent: Mar. 15, 2005

(54) TRANSFLECTIVE MODE COLOR LIQUID CRYSTAL DISPLAY

(75) Inventors: Pin Chang, Hsinchu (TW); Alex Lin, Miaoli (TW)

(73) Assignee: Giantplus Technology Co., Ltd., Miali Hsien (TW)

( * ) Notice: Subject to any disclaimer, the term of this patent is extended or adjusted under 35 U.S.C. 154(b) by 116 days.

(21) Appl. No.: 10/105,268

(22) Filed: Mar. 26, 2002

(65) Prior Publication Data

US 2003/0184694 A1 Oct. 2, 2003

(51) Int. Cl.⁷ .............................................. G02F 1/1335
(52) U.S. Cl. ...................... 349/114; 349/106; 359/263; 359/622
(58) Field of Search .............................. 349/114, 106; 359/263, 622

(56) References Cited

U.S. PATENT DOCUMENTS

| | | | | |
|---|---|---|---|---|
| 5,920,367 A | * | 7/1999 | Kajimoto et al. | 349/162 |
| 6,008,871 A | * | 12/1999 | Okumura | 349/61 |
| 6,552,767 B1 | * | 4/2003 | Kaneko | 349/119 |
| 2001/0043297 A1 | * | 11/2001 | Arai | 349/114 |
| 2002/0154257 A1 | * | 10/2002 | Iijima | 349/67 |
| 2002/0159261 A1 | * | 10/2002 | Hildenbrand et al. | 362/341 |
| 2002/0171792 A1 | * | 11/2002 | Kubota et al. | 349/114 |

* cited by examiner

Primary Examiner—Tarifur R. Chowdhury
Assistant Examiner—P. R. Akkapeddi
(74) Attorney, Agent, or Firm—Rosenberg, Klein & Lee (57) ABSTRACT

The present invention discloses a transflective mode color liquid crystal display, whose white backlight source is composed of several narrowband monochromatic light sources. A color filter for displaying colors is designed to match the wavelength of each of the monochromatic light sources so that the color filter can let a monochromatic light source of one color be transmitted, while selectively absorb the wavelengths of the monochromatic light sources of other colors. The present invention can achieve high color saturation at the backlight mode while maintaining high reflectance.

20 Claims, 8 Drawing Sheets

TRANSFLECTIVE MODE COLOR LIQUID CRYSTAL DISPLAY

FIELD OF THE INVENTION

The present invention relates to a color liquid crystal display (LCD) and, more particularly, to a transflective mode color LCD having both the displaying effects of high reflectance at the reflective mode and high color saturation at the transmitive mode.

BACKGROUND OF THE INVENTION

LCDs are optoelectronic products for display, among which the STN LCD is the mainstream technique of display for portable electronic products (e.g., mobile phones, PDAs, and electronic dictionaries). The TFT LCD is almost the only one choice of display for the notebook computer. The thickness of LCD for the desktop computer is only 20% of that of a conventional CRT, and the weight thereof is only 10% of that of a conventional CRT, hence greatly saving space. In addition to light weight and thin thickness, the LCD will not glitter and emit out radiation, and dissipate low power. Therefore, LCDs are more popularized in the market.

Portable electronic products like mobile phones and PDAs general use transflective mode LCDs. The brightness of transflective mode LCD can be enhanced with backlight indoors or at dark place. Backlight can be turned off outdoors or at bright place to achieve power-saving effect. Moreover, the transflective mode LCD keeps good displaying effect under strong light (e.g., the sunlight), while the displaying effect of the transmitive mode LCD (e.g., commonly used in the notebook computer) is bad because of insufficient brightness. Owing to both the power-saving and sunlight readable characteristics, the transflective mode LCD is the mainstream displaying technique of portable electronic products.

For transflective mode color LCDs, a balanced point is got between the reflectance at the reflective mode and the color saturation at the transmitive mode in the prior art. Usually, the color saturation is accommodated to the reflectance. The result is that the color saturation at the reflective mode is barely acceptable. The color saturation at the transmitive mode is mostly sacrificed. For high-end portable products like notebook computers, because the color saturation cannot meet the requirement of user, present transflective mode LCDs cannot be used to achieve the sunlight readable characteristic.

Accordingly, the present invention aims to propose a transflective mode color LCD capable of giving consideration to high reflectance and high color saturation at the transmitive mode.

SUMMARY OF THE INVENTION

The primary object of the present invention is to propose a transflective mode color LCD, which can achieve high color saturation at the transmitive mode when backlight is used while maintaining high reflectance.

Another object of the present invention is to propose a transflective mode color LCD, whereby color saturation at the transmitive mode will not be limited by reflectance at the reflective mode so as to increase degree of freedom in design.

To achieve the above objects, the present invention comprises a transflective mode LCD panel, a backlight source, and a color filter matched with the backlight source. The transflective mode LCD panel is composed at least of a pair of opposite transparent substrates with a liquid crystal layer sandwiched between them, and is also provided with a partly transmitive and partly reflective semi-reflective layer. The backlight source is composed at least of red, green, and blue narrowband light source components. The color filter is disposed between the two transparent substrates and above the semi-reflective layer. The color filter is composed at least of red, green, and blue color pieces, and each color piece has a gap-shaped absorption band.

The various objects and advantages of the present invention will be more readily understood from the following detailed description when read in conjunction with the appended drawings, in which:

BRIEF DESCRIPTION OF THE DRAWINGS

FIG. 4 compares the transmitted spectra of red color piece (FIG. 4A), green color piece (FIG. 4B), and blue color piece (FIG. 4C) of a color filter used in the prior art and in an embodiment of the present invention;

DETAILED DESCRIPTION OF THE PREFERRED EMBODIMENTS

Figure 1:
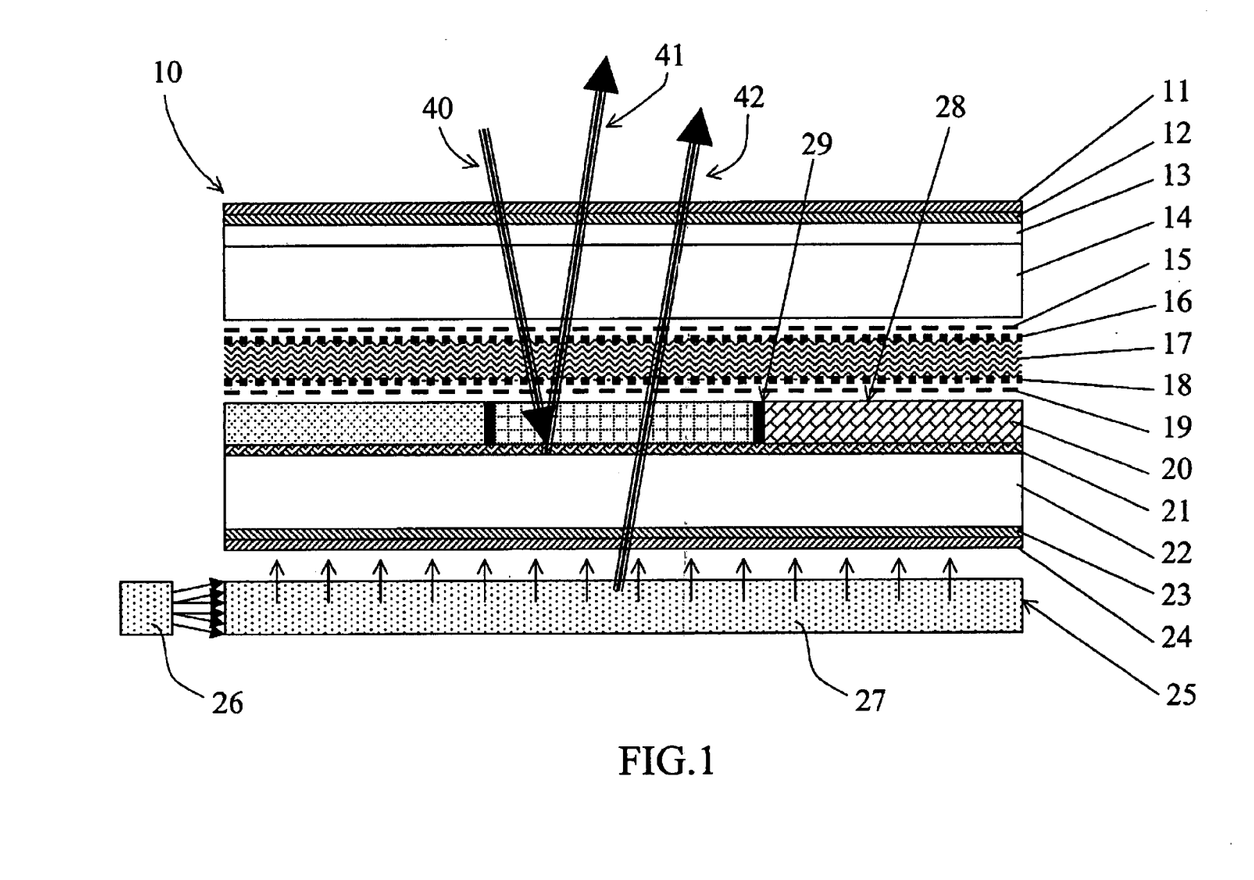
FIG. 1 is a structure diagram of a transflective mode STN color LCD of the present invention.

As shown in FIG. 1, a transflective mode STN color LCD 10 comprises a pair of opposite transparent substrates—an upper substrate 14 and a lower substrate 22, usually being composed of transparent glass substrate or other transparent material. The two transparent substrates 14 and 22 are parallel spaced up and down with a liquid crystal layer 17 sandwiched between them. An upper phase retardation film 12 (for compensation of dispersion and having also the effect of improving the visual angle) and an upper polarizer 11 are pasted on the upper substrate 14. Particles are usually added in the adhesive for pasting the upper polarizer 11 and the upper phase retardation film 12 on the upper substrate 14 to cause light scattering effect. This is used as a diffusive layer 13 (scattering effect can also be achieved at a semi-reflective layer 21 or at a passivation of a color filter). A transparent electrode 15 is disposed at the face of the upper substrate 14 facing the liquid crystal layer 17. The material of the transparent electrode 15 is usually indium tin oxide (ITO). The transparent electrode 15 is used to provide voltage for controlling the direction of liquid crystal molecules. An orientation layer 16 covers the transparent electrode 15 and abuts the liquid crystal layer 17. The orientation layer 16 is responsible for guiding the direction of liquid crystal molecules.

An orientation layer 18 of the lower substrate 22 abuts and is below the liquid crystal layer 17. A transparent electrode 19 of the lower substrate 22 is below the orientation layer 18, and a color filter 20 is below the transparent electrode 19. The color filter 20 is used to generate colors (The color filter can also be placed above the liquid crystal layer). A semi-reflective layer 21 is below the color filter 20 (the semi-reflective layer can also be placed below the lower substrate 22, or a lower polarizer with an inbuilt semi-reflective layer can be used). Part of an incident light 40 is reflected by the semi-reflective layer 21 to be a reflected light 41. The semi-reflective layer 21 also lets part of backlight be transmitted to be a transmitted light 42. A lower phase retardation film 23 (dispensable and dependent on the design) and a lower polarized 24 (sometimes with an inbuilt semi-reflective layer 21) are pasted on the outer surface of the lower substrate 22. A backlight set 25 is at the lowest position. The backlight set 25 is usually composed of a backlight source 26 and a backlight guide plate 27. The backlight guide plate 27 uniformly distributes light of the backlight source 26 to the whole display region. The light source can also be directly placed below the display panel.

Figure 2:
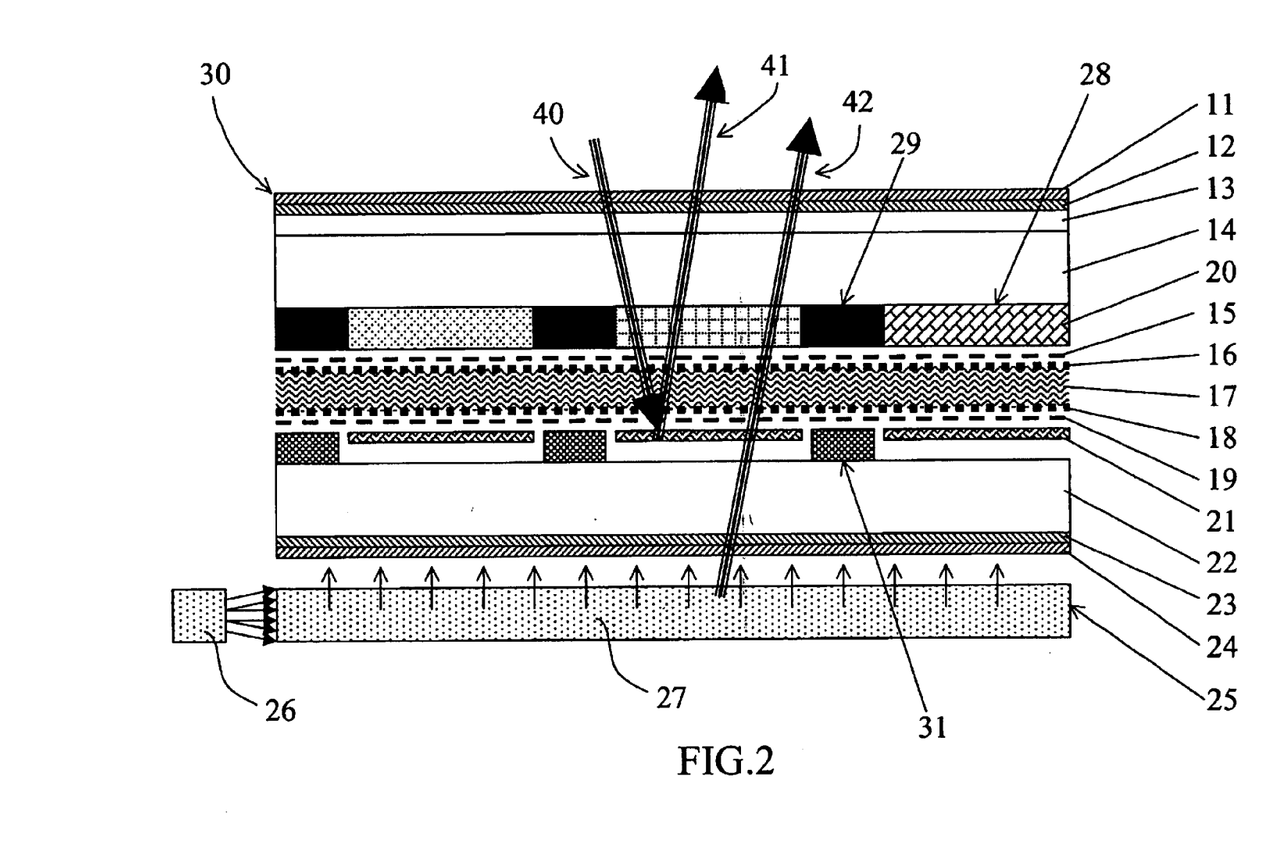
FIG. 2 is a structure diagram of a transflective mode TFT color LCD of the present invention.

As shown in FIG. 2, except a pixel drive element 31, the basic architecture of a transflective mode TFT color LCD differs little from that shown in FIG. 1. From top to bottom are an upper polarizer 11, an upper phase retardation film 12, a diffusive layer 13 (scattering effect can also be achieved at a semi-reflective layer or at a passivation of a color filter), an upper substrate 14, a color filter 20 (can also be placed above a semi-reflective layer of a lower substrate to avoid deviation of assembly), a transparent electrode 15, an orientation layer 16, a liquid crystal layer 17 (design of liquid crystal commonly used in TFT is different from that in STN), an orientation layer 18, a transparent electrode 19, a semi-reflective layer 21, a pixel drive element 31 for driving individual pixel, a lower substrate 22, a lower phase retardation film 23, a lower polarizer 24, and a backlight set 25, respectively.

Figure 3:
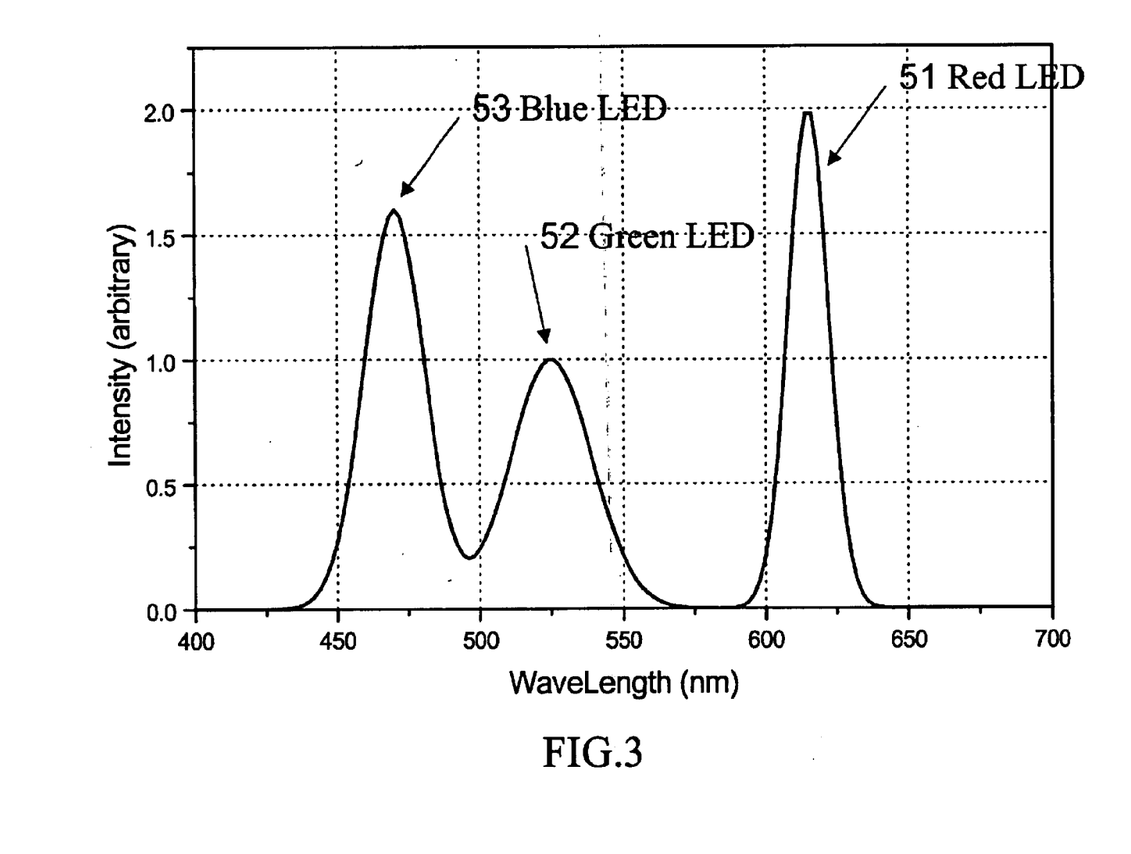
FIG. 3 is a diagram showing the wavelength spectrum of a backlight source used in an embodiment of the present invention.

The backlight source 26 used in the above backlight set 25 adopts a red LED 51, a green LED 52, and a green LED 53. FIG. 3 is a diagram showing the wavelength spectrum of a white backlight source composed of the red, green, and blue LEDs 51, 52, and 53 used in an embodiment of the present invention. Based on the principle of the present invention, the selection of wavelength of light source is not limited, but the three primary colors of red, green, and blue are preferred. It is also necessary to take into account factors like efficiency of LED and visual brightness effect. The red, green, and blue LEDs used in the embodiment of the present invention have peak wavelengths at 615 nm, 525 nm, and 470 nm, respectively.

Figure 6:
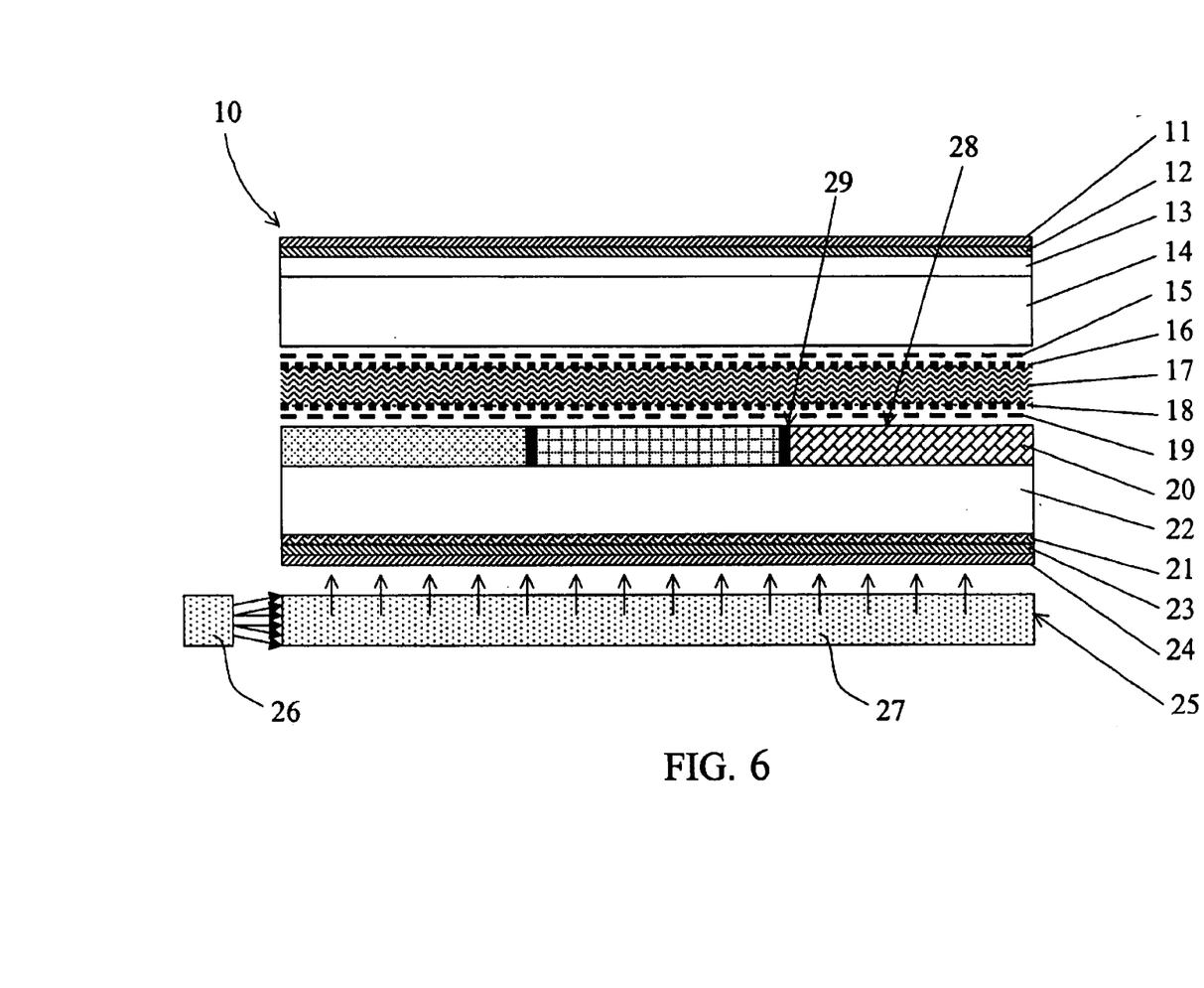
FIG. 6 is a structure diagram of an alternative embodiment of the transflective mode STN color LCD of the present invention.

FIG. 6 shows an alternative embodiment of the transflective mode STN color LCD 10 of FIG. 1, in which the semi-reflective layer 21 is positioned beneath the lower substrate 22, to be sandwiched between the lower substrate 22 and the lower phase retardation film 23.

Figure 4A:
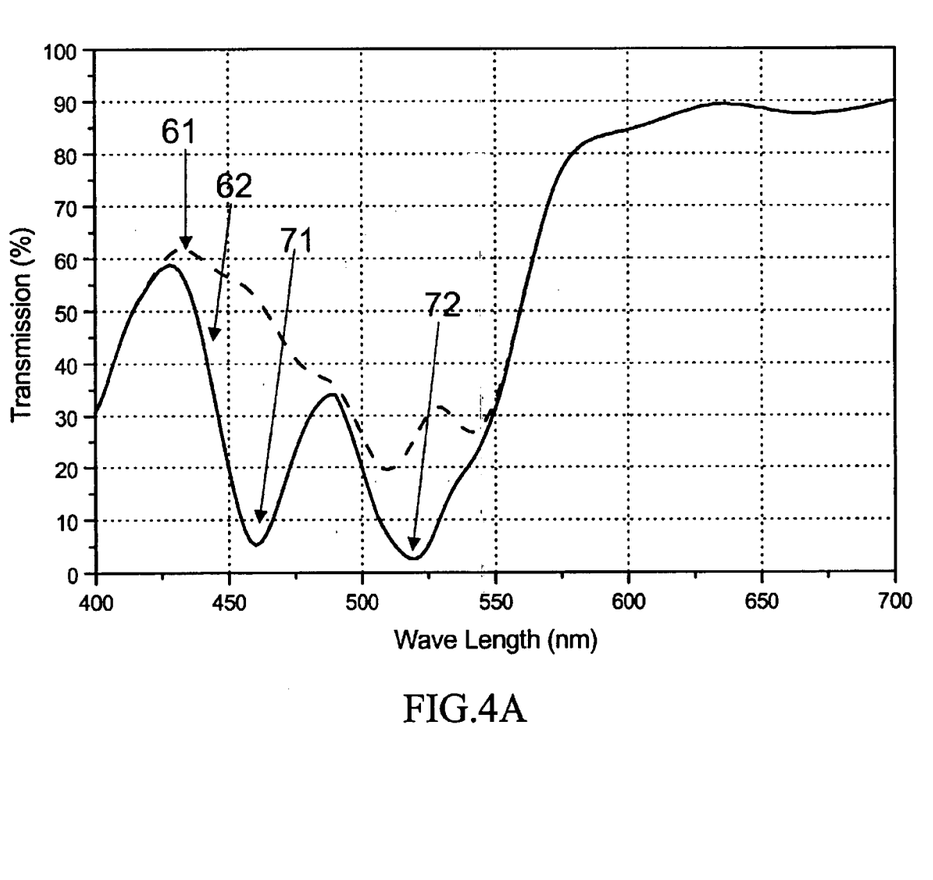

FIG. 4A compares the transmitted spectra of red color pieces of the color filter used in the prior art and an embodiment of the present invention. The transmitive spectrum 61 of the red color piece of the color filter used in the prior art has a high transmittance (averagely about 85%) at the wavelength of red color and a not low transmittance (averagely about 40%) outside the wavelength of red color. Most of existent transmitive spectrum can be used for the transmitive spectrum 62 of the red color piece used in the embodiment of the present invention. Specially designed transmitive gaps are required only at the emittive wavelengths of the green and blue LEDs to enhance absorption at the wavelengths of the green and blue LEDs. A gap 71 for absorbing blue light has a valley wavelength of 470 nm. A gap 72 for absorbing green light has a valley wavelength of 525 nm. The valley wavelength of the absorption gap is not necessarily the same as the peak wavelength of the LED. Especially, the width of the absorption gap needs to be slightly larger than the emittive width of the LED so as to tolerate variation range of emittive wavelength of LED in mass production.

Figure 4B:
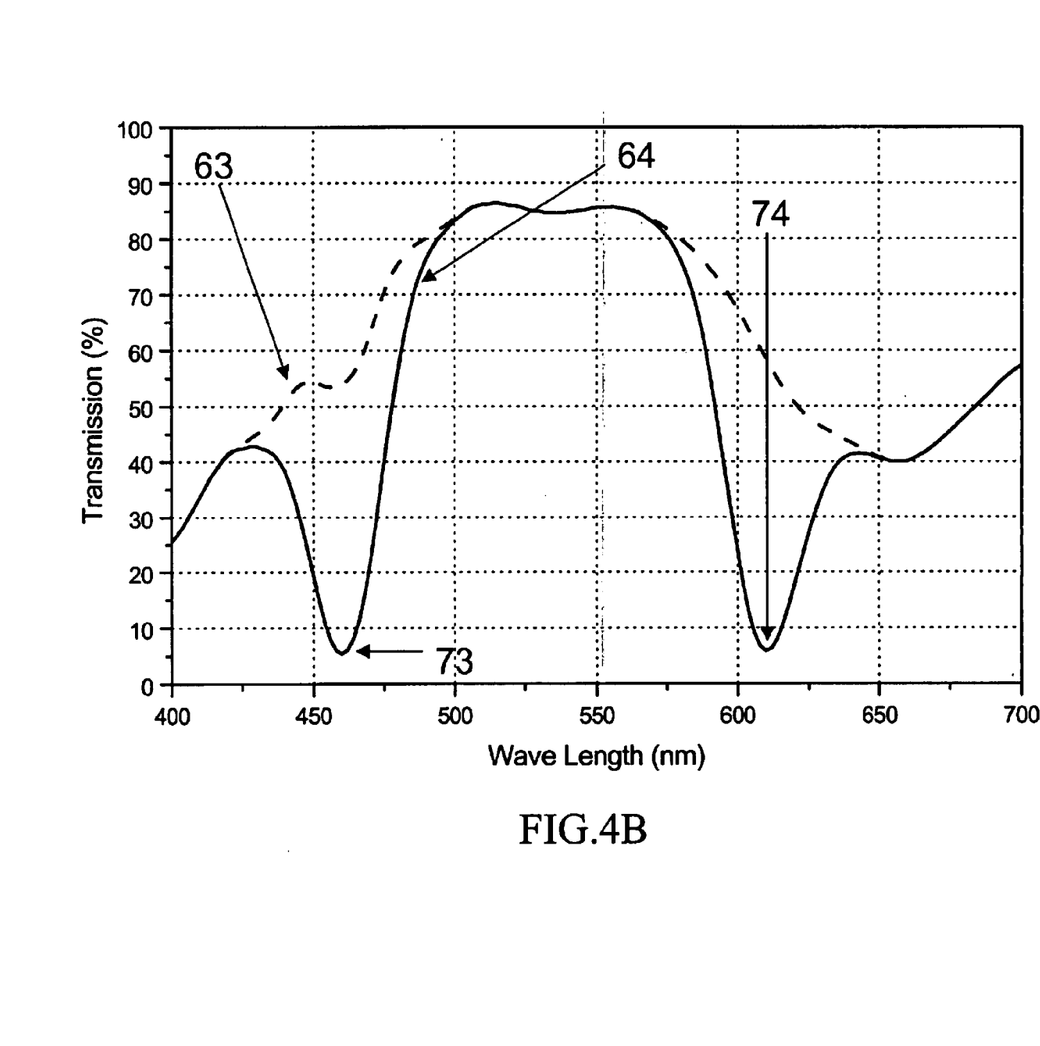

FIG. 4B compares the transmitted spectra of green color pieces of the color filter used in the prior art and an embodiment of the present invention. The transmitive spectrum 63 of the green color piece of the color filter used in the prior art has a high transmittance (averagely about 83%) at the wavelength of green color and a not low transmittance (averagely about 35%) outside the wavelength of green color. Most of existent transmitive spectrum can be used for the transmitive spectrum 64 of the green color piece used in the embodiment of the present invention. Specially designed transmitive gaps are required only at the emittive wavelengths of the red and blue LEDs to enhance absorption at the wavelengths of the red and blue LEDs. A gap 74 for absorbing red light has a valley wavelength of 615 nm. A gap 73 for absorbing blue light has a valley wavelength of 470 nm. The valley wavelength of the absorption gap is not necessarily the same as the peak wavelength of the LED. Especially, the width of the absorption gap needs to be slightly larger than the emittive width of the LED so as to tolerate variation range of emittive wavelength of LED in mass production.

Figure 4C:
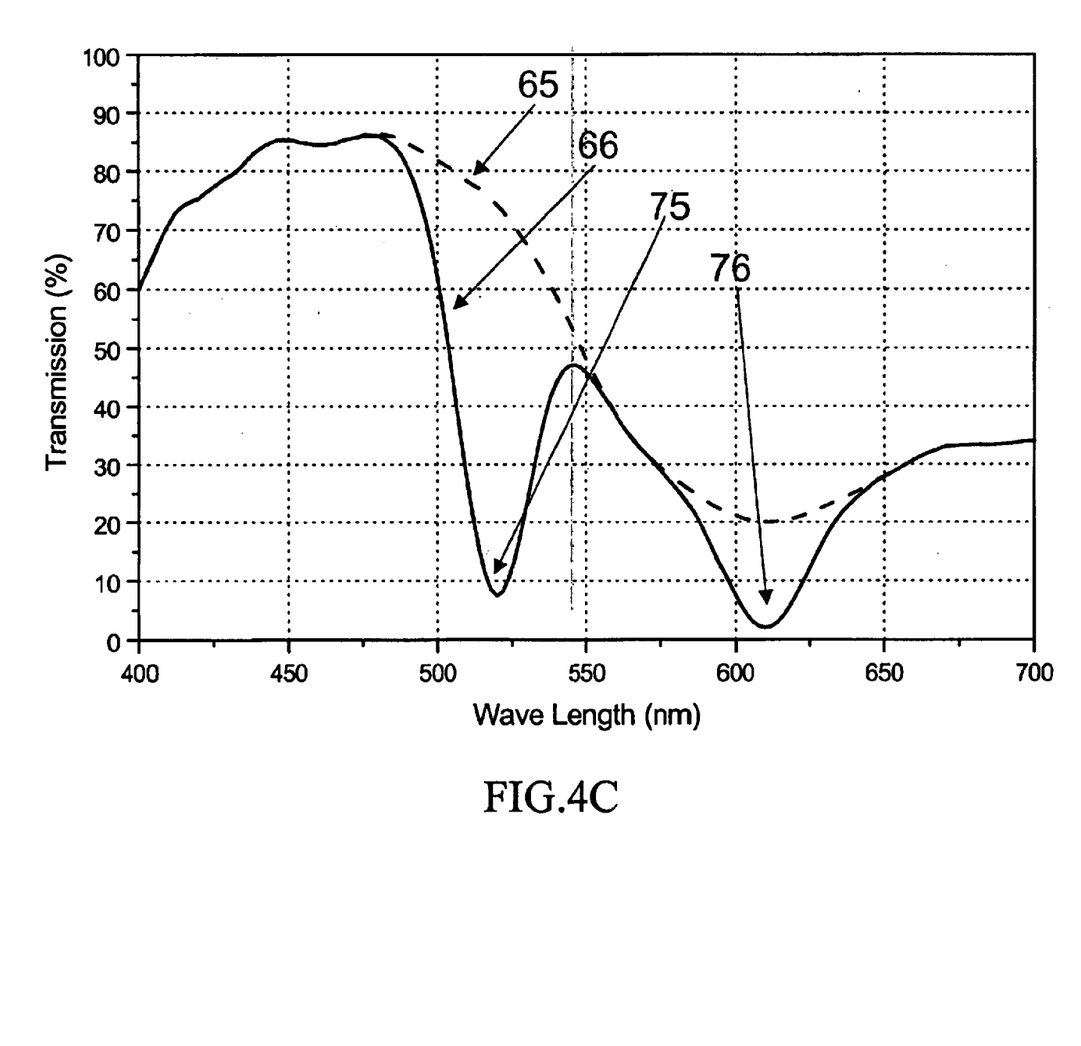

FIG. 4C compares the transmitted spectra of blue color pieces of the color filter used in the prior art and an embodiment of the present invention. The transmitive spectrum 65 of the blue color piece of the color filter used in the prior art has a high transmittance (averagely about 80%) at the wavelength of blue color and a not low transmittance (averagely about 30%) outside the wavelength of blue color. Most of existent transmitive spectrum can be used for the transmitive spectrum 66 of the blue color piece used in the embodiment of the present invention. Specially designed transmitive gaps are required only at the emittive wavelengths of the red and green LEDs to enhance absorption at the wavelengths of the red and green LEDs. A gap 76 for absorbing red light has a valley wavelength of 615 nm. A gap 75 for absorbing green light has a valley wavelength of 525 nm. The valley wavelength of the absorption gap is not necessarily the same as the peak wavelength of the LED. Especially, the width of the absorption gap needs to be slightly larger than the emittive width of the LED so as to tolerate variation range of emittive wavelength of LED in mass production.

Figure 5:
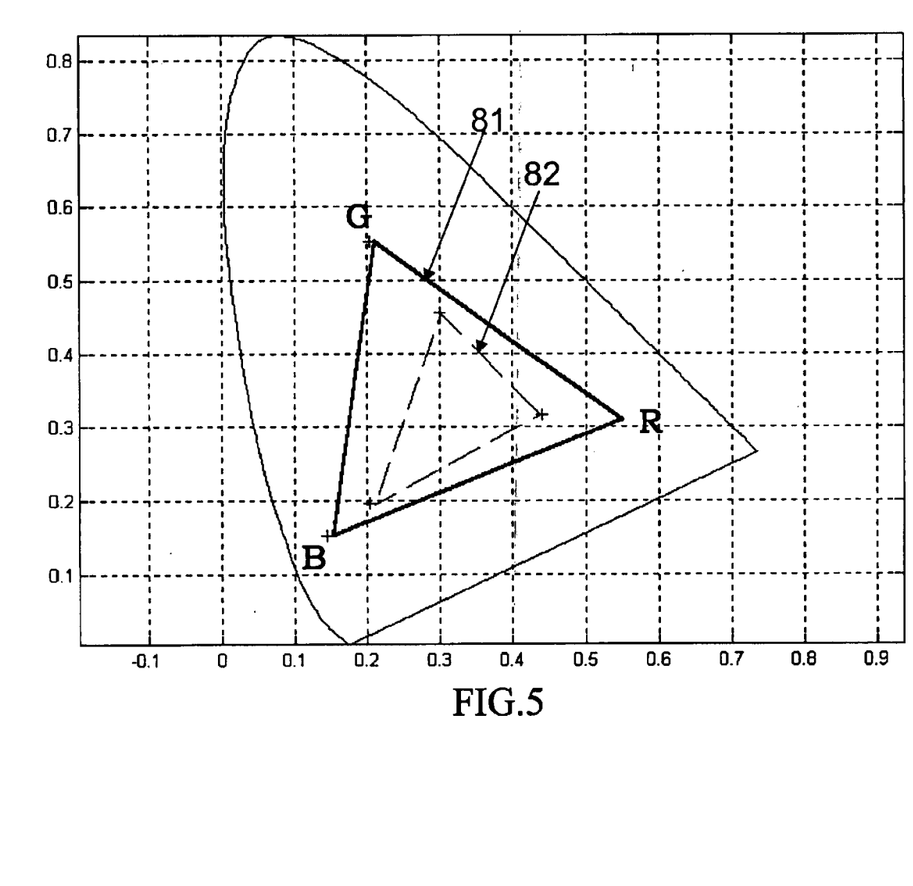
FIG. 5 is a comparison diagram of CIE color coordinate at the transmitive mode of a color filter of the present invention.

FIG. 5 is a comparison diagram of CIE color coordinate of the prior art and the present invention. The larger the triangle in the CIE color coordinate, the higher the color saturation. A dashed triangle 82 shows the CIE range of the color filter (FIG. 4) disclosed in an embodiment of the present invention, while a solid triangle 81 shows the simulated CIE range by using the backlight source (FIG. 3) as well as the color filter (FIG. 4) disclosed in the embodiment of the present invention. As can be clearly seen, the present invention has an evident effect of enhancing the color saturation at the transmittive mode.

The liquid crystal displaying technique makes use of liquid crystal as medium for controlling state of light to achieve displaying effect. Along with continual progress of scientific technology and information, the requirement for plentiful colors of people becomes more and more indispensable. In order to display plentiful colors, color filters are widely used in color LCDs. No matter passive matrix STN LCDs or active matrix TFT LCDs, the mainstream techniques of color display all use color filters to generate various kinds of colors. A color filter is basically formed by arranging many small pieces of the three primary colors of red, green, and blue, as the color pieces 28 shown in FIGS. 1 and 2. Although not indispensable, black frames 29 are used to separate the color pieces 28 for enhancing contrast sometimes. The color filter absorbs unwanted wavelengths to generate the demanded color. For instance, a red block absorbs other wavelengths, but only lets red light pass; a green block absorbs other wavelengths, but only lets green light pass; a blue block absorbs other wavelengths, and only lets blue light pass. The transmittance of each color piece 28 is controlled by an exclusive liquid crystal pixel. The higher the transmittance, the larger contribution the primary color. Through combination of various kinds of intensities of the three primary colors and the additive mixing effect of eyes, people can see various kinds of colors. The way of arrangement of the small color pieces can generally be divided into stripe type (e.g., LCD of computer) and mosaic type (also called delta type, e.g., LCD of digital still camera). Routinely, a set of the three primary colors of red, green, and blue is called a pixel in the stripe type, and each small color piece is called a color dot.

Because the transflective mode LCD has both the power-saving and sunlight readable characteristics, it is the mainstream displaying technique of portable electronic products. The transflective mode color LCD has two working modes: the transmitive mode and the reflective mode. At the transmitive mode, in order to match the optical design of the reflective mode, a phase retardation film must be used below a semi-reflective layer. Except this point, the principle of the transflective mode LCD is similar to that of a common transmitive mode LCD. Of course, the transmittance thereof will be affected by the semi-reflective layer to decrease. At the reflective mode, after light passes the first polarizer, the phase retardation film, the liquid crystal layer, and then the color pieces of the color filter, part of the light will be reflected by the semi-reflective layer. The reflective light will similarly pass the color pieces of the color filter, the liquid crystal layer, the phase retardation film, and then the first polarizer, only part of the light can be transmitted. Although the optical designs differ, the basic principles are the same.

At the reflective mode, because of absorption of the color filter, the reflectance is very low (the efficiency of use of light is very low). In order to enhance the reflectance of the display, the transmittance of the color filter must be enhanced. The way of enhancing the transmittance of the color filter is to lower the absorption for wavelength not to be transmitted originally. The color saturation will thus be reduced. In other words, in order to enhance the reflectance of the display, the color saturation of the color filter must be reduced. Once the color saturation of the color filter is reduced, the color saturation of the transflective mode color LCD is naturally reduced. Moreover, because light must pass the color filter twice at the reflective mode, the color saturation is barely satisfactory; but at the transmitive mode, light only passes the color filter once, the color saturation is much worse.

For the transflective mode color LCD, a compromise balanced point is chosen between reflectance and color saturation at the reflective mode. Usually, color saturation is accommodated to reflectance. The result is that the color saturation at the reflective mode is barely satisfactory, and the color saturation at the transmitive mode is mostly sacrificed. The present invention aims to propose a transflective mode color LCD having both the displaying effects of high reflectance at the reflective mode and high color saturation at the transmitive mode so as to solve the above drawback.

The present invention continues using the existent architecture of color LCD and optical design of liquid crystal. The innovation is at (1) the composite spectrum of the backlight source and (2) the transmitive spectrum of the color filter. Moreover, the present invention applies to any color LCD using backlight and color filter. More specific embodiments will be described below to illustrate more clearly.

(1) Composite Spectrum of Backlight Source: Narrowband Composite Light Source

The wavelength of visible light is about within 400 and 750 nm. The prior art white backlight source uniformly distributes the spectrum tooth and nail. On the contrary, the color saturation of a narrowband light source is the highest. Except the violet region, the boundaries of the whole CIE color coordinate are limits of the purest colors defined by monochromatic light sources. The backlight source used in the present invention is composed of several narrowband light sources. For instance, the color saturation of an ordinary LED is very high. The present invention selects three LEDs of red, green, and blue colors and adjusts proper relative intensities to assemble a white light source (referring to FIG. 3). This kind of light source matched with present color filter can only achieve indistinct effect. Accordingly, only this cannot let any single monochromatic light source have the opportunity of standing out.

(2) Transmitive Spectrum of Color Filter: Color Filter of Narrowband Absorption

In order to let any single monochromatic light source have the opportunity of standing out, the transmitive spectrum of the color filter must be modified in accordance. With the light source of three LCDs of red, green, and blue as an example, when the pure red color is to be showed, the LCD will block the light passing blue and green color pieces. Only LCD pixels corresponding to red color pieces will be transmitted. But the problem is that when 95% of red light of the red LED passes the red color pieces of the color filter, about 30% of green and blue light of the green and blue LEDs will also be transmitted. The green and blue light will dilute the very pure red color. In the present invention, because the green and blue LEDs are two narrowband light sources, it is only necessary to modify the spectrum of the red color pieces of the color filter to more absorb the wavelengths of the green and blue LEDs, e.g., reducing the transmittance to below 5%. In the present invention, because narrowband light sources are used, and only specific wavelengths are to be absorbed, it is only necessary to perform narrowband absorption at specific wavelengths. Narrowband absorption causes gap-shaped absorption bands at the transmitive spectrum of the color filter, hence little affecting the whole transmittance of the color filter. In other words, at the same time when the color saturation at the transmitive mode is greatly enhanced, high reflectance at the reflective mode can still be kept.

The above only exemplifies the red spectrum. By analogy, in order to show highly pure green color, the spectrum of green color pieces of the color filter must be modified to more absorb the wavelengths of the red and blue LEDs. Similarly, in order to show highly pure blue color, the spectrum of blue color pieces of the color filter must be modified to more absorb the wavelengths of the red and green LEDs.

Illustrating with more specific embodiments, as shown in FIG. 3, the wavelengths of red, green, and blue LEDs used in the present invention are 470 nm, 525 nm, and 615 nm, respectively. As for the color filter, in order to illustrate conveniently, the transmitive spectrum of existent color filter is used as the start point with necessary modification.

The dashed line in FIG. 4A is the transmitive spectrum 61 of red color pieces in the prior art. The present invention modifies the transmitive spectrum to let the red color pieces selectively more absorb the wavelengths of the green and blue LEDs. The transmitive spectrum thus becomes the solid line 62 shown in FIG. 4A. The transmitive spectrum has gaps 71 and 72 at the blue and green colors. The valley wavelengths are at 470 nm and 525 nm, respectively, i.e., the peak wavelengths of the emitive spectra of the blue and green LEDs. In fact, the valley wavelength of absorption is not necessarily at the peak wavelength of LED. It is only necessary to more absorb the wavelengths of the green and blue LEDs so as to enhance the color saturation of red color.

Similarly, The dashed line in FIG. 4B is the transmitive spectrum 63 of green color pieces in the prior art. The present invention modifies the transmitive spectrum to let the green color pieces selectively more absorb the wavelengths of the red and blue LEDs. The transmitive spectrum thus becomes the solid line 64 shown in FIG. 4B. The transmitive spectrum has gaps 73 and 74 at the blue and red colors. The valley wavelengths are at 470 nm and 615 nm, respectively, i.e., the peak wavelengths of the emitive spectra of the blue and red LEDs. In fact, the valley wavelength of absorption is not necessarily at the peak wavelength of LED. It is only necessary to more absorb the wavelengths of the blue and red LEDs so as to enhance the color saturation of green color. The dashed line in FIG. 4C is the transmitive spectrum 65 of blue color pieces in the prior art. The present invention modifies the transmitive spectrum to let the blue color pieces selectively more absorb the wavelengths of the green and red LEDs. The transmitive spectrum thus becomes the solid line 66 shown in FIG. 4C. The transmitive spectrum has gaps 75 and 76 at the green and red colors. The valley wavelengths are at 525 nm and 615 nm, respectively, i.e., the peak wavelengths of the emitive spectra of the green and red LEDs. In fact, the valley wavelength of absorption is not necessarily at the peak wavelength of LED. It is only necessary to more absorb the wavelengths of the red and green LEDs so as to enhance the color saturation of blue color.

The dashed triangle 82 in FIG. 5 is the CIE color coordinate of the above color filter under the D65 standard light source, while the solid triangle 81 in FIG. 5 is the CIE color coordinate of the same color filter matched with the backlight source of the above red, green, and blue LEDs. The effect of enhancing the color saturation of the present invention can be clearly seen. Additionally, in order to illustrate conveniently, the spectrum of the color filter in the above embodiment uses the transmitive spectrum of existent color filter as the start point with necessary modification. The color filter de facto can be more modified to achieve more distinct effect. Specifically, the present invention can enhance the average transmittance of each color piece on the condition of keeping the absorption gaps. The result is that at the same time when the transmittance of the color filter is enhanced, the range of the dashed triangle is also shrunk. This is compromise between transmittance and color saturation in the prior art. If the prior art is used, the color saturation at the transmitive mode will be reduced. However, in the present invention, the range of the solid triangle can be kept invariable.

In other words, the present invention can separately design the CIE color coordinate of the color filter itself and the CIE color coordinate at the transmitive mode. Design of the CIE color coordinate at the transmitive mode is determined by the narrowband light sources and transmitive gaps of the color filter. Design of the CIE color coordinate at the reflective mode is determined by the CIE color coordinate of the color filter itself and compromise of transmittance. Because the transmitive gaps selectively absorb the narrowband light sources, they have little influence to the whole CIE color coordinate and transmittance. The primary object of the present invention is to greatly enhance transmittance of the color filter so as to enhance reflectance at the reflective mode. Simultaneously, the transmitive gaps matched with the narrowband light sources can greatly enhance color saturation at the transmitive mode (i.e., enlarging the range of the CIE color coordinate).

Accordingly, the transflective mode color LCD proposed in the present invention can achieve higher color saturation at the backlight mode while maintaining the displaying effect of high reflectance. Therefore, a transflective mode color LCD having both high brightness and high color saturation can be obtained to achieve better color displaying effect at both the reflective mode and backlight mode.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A transflective mode color LCD, comprising:
    a transflective mode color LCD panel composed at least of a pair of opposite transparent substrates with a liquid crystal layer sandwiched between them and also provided with a partly transmitive and partly reflective semi-reflective layer;
    a backlight source whose main composite components within the visible light region are composed at least of red, green, and blue narrowband light sources, wherein
        (a) the peak wavelength of said red narrowband light source is within 590~750 nm, and the full width half maximum thereof is smaller than 80 nm;
        (b) the peak wavelength of said green narrowband light source is within 500~560 nm, and the full width half maximum thereof is smaller than 80 nm;
        (c) the peak wavelength of said blue narrowband light source is within 400~480 nm, and the full width half maximum thereof is smaller than 80 nm; and
    a color filter matched with said backlight source, said color filter being disposed between said two transparent substrates and above said semi-reflective layer, said color filter being composed at least of red, green, and blue color pieces, wherein
        (a) the red color piece being formed of a material having a transmitive spectrum having an average transmittance of at least 80% at the red color wavelength region and an average transmittance of Rr for other visible light wavelengths with 15%<Rr<80%, and said red color piece selectively absorbs said green and blue narrowband light sources so that the transmittances of said red color piece for said green and blue narrowband light sources will be less than 15%, respectively;
        (b) the green color piece being formed of a material having a transmitive spectrum having an average transmittance of at least 80% at the green color wavelength region and an average transmittance of Rg for other visible light wavelengths with 15%<Rg<80%, and said green color piece selectively absorbs said red and blue narrowband light sources so that the transmittances of said green color piece for said red and blue narrowband light sources will be less than 15%, respectively; and (c) the blue color piece being formed of a material having a transmitive spectrum having an average transmittance at least 80% at the blue color wavelength region and an average transmittance of Rb for other visible light wavelengths with 15%<Rb<80%, and said blue color piece selectively absorbs said green and red narrowband light sources so that the transmittances of said blue color piece for said green and red narrowband light sources will be less than 15%, respectively.

2. The transflective mode color LCD as claimed in claim 1, wherein at least one of said transparent substrates of said LCD panel has diode or field-effect transistor devices for driving individual pixel.

3. The transflective mode color LCD as claimed in claim 1, wherein said LCD panel uses STN mode and is driven in multiplex scanning way.

4. The transflective mode color LCD as claimed in claim 1, wherein said LCD panel uses TN mode.

5. The transflective mode color LCD as claimed in claim 1, wherein after said backlight source is assembled to be a white light, the CIE color coordinate (x, y) thereof satisfies the following formulae:

$$(x-0.316)^2+(y-0.320)^2<(0.08)^2.$$

6. The transflective mode color LCD as claimed in claim 1, wherein said backlight source is an LED.

7. The transflective mode color LCD as claimed in claim 6, wherein said LED is an organic LED.

8. The transflective mode color LCD as claimed in claim 1, wherein said backlight source is a cold cathode fluorescent lamp device.

9. The transflective mode color LCD as claimed in claim 1, wherein said semi-reflective layer is between said liquid crystal layer and the lower one of said two transparent substrate.

10. The transflective mode color LCD as claimed in claim 1, wherein said semi-reflective layer is below the lower one of said two transparent substrates.

11. The transflective mode color LCD as claimed in claim 1, wherein said backlight source uses an electroluminescence device.

12. The transflective mode color LCD as claimed in claim 2, wherein said LCD panel adopts vertical alignment mode.

13. The transflective mode color LCD as claimed in claim 2, wherein said LCD panel adopts in plane switching mode.

14. The transflective mode color LCD as claimed in claim 2, wherein said diode or field-effect transistor devices for driving individual pixel use amorphous silicon as the basis.

15. The transflective mode color LCD as claimed in claim 2, wherein said diode or field-effect transistor devices for driving individual pixel use poly silicon as the basis.

16. The transflective mode color LCD as claimed in claim 1, wherein the wavelength of said visible light range is within 400~750 nm.

17. The transflective mode color LCD as claimed in claim 1, wherein above 75% of the main composite components of said backlight source are composed of red, green, and blue narrowband light sources.

18. The transflective mode color LCD as claimed in claim 1, wherein the wavelength range of said red light is within 600~700 nm, and the wavelength range of other visible light is within 400~580 nm.

19. The transflective mode color LCD as claimed in claim 1, wherein the wavelength range of said green light is within 500~570 nm, and the wavelength range of other visible light is within 400~480 nm and 580~700 nm.

20. The transflective mode color LCD as claimed in claim 1, wherein the wavelength range of said blue light is within 430~490 nm, and the wavelength range of other visible light is within 500~700 nm.

* * * * *